(12) United States Patent
Kadota

(10) Patent No.: US 10,530,291 B2
(45) Date of Patent: Jan. 7, 2020

(54) SOLAR CELL MODULE MOUNTING STRUCTURE AND SOLAR CELL MODULE MOUNTING METHOD

(71) Applicant: Kaneka Corporation, Osaka (JP)

(72) Inventor: Naoki Kadota, Osaka (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 15/963,653

(22) Filed: Apr. 26, 2018

(65) Prior Publication Data
US 2019/0131915 A1 May 2, 2019

Related U.S. Application Data

(63) Continuation of application No. PCT/JP2016/081622, filed on Oct. 25, 2016.

(30) Foreign Application Priority Data

Oct. 27, 2015 (JP) .................. 2015-211257

(51) Int. Cl.
*H02S 20/22* (2014.01)
*H02S 20/26* (2014.01)
*H02S 30/10* (2014.01)

(52) U.S. Cl.
CPC .............. *H02S 20/22* (2014.12); *H02S 20/26* (2014.12); *H02S 30/10* (2014.12); *Y02B 10/10* (2013.01)

(58) Field of Classification Search
CPC .......... H02S 20/22; H02S 30/10; E04F 13/08; E04F 13/14
See application file for complete search history.

(56) References Cited

U.S. PATENT DOCUMENTS 8,119,963 B2 * 2/2012 Scanlon .................. H02S 20/32
250/203.4
8,601,752 B2 * 12/2013 Prentice .................. E04D 3/405
52/173.1

(Continued)

FOREIGN PATENT DOCUMENTS

EP 2626649 A1 * 8/2013 ............. H02S 20/32
FR 2857997 A1 * 1/2005 ............. H02S 30/20

(Continued)

OTHER PUBLICATIONS

International Preliminary Report on Patentability issued in International Application No. PCT/JP2016/081622; dated May 11, 2018 (7 pages).

(Continued)

*Primary Examiner* — Adriana Figueroa
(74) *Attorney, Agent, or Firm* — Osha Liang LLP

(57) ABSTRACT

A solar cell module mounting system for fixing a plurality of solar cell modules to a side wall of a building, the plurality of solar cell modules include a plurality of first solar cell modules. Each of the plurality of first solar cell modules includes a first side and a second side, the first side being proximal to the side wall of the building, the second side being distally positioned and lower than the first side and/or at a position outwardly away from the side wall part of the building. The plurality of the first solar cell modules are arranged vertically, and a relationship of $16 \leq \theta_1 - (32/11) \leq 56$ is satisfied for adjacent vertically arranged first solar cell modules.

5 Claims, 10 Drawing Sheets

(56) References Cited

U.S. PATENT DOCUMENTS

| | | | | | |
|---|---|---|---|---|---|
| 8,898,968 | B2* | 12/2014 | Keller | ............ | H02S 20/20 |
| | | | | | 52/173.3 |
| 8,919,077 | B2* | 12/2014 | Keller | ............ | H02S 40/32 |
| | | | | | 52/747.12 |
| 8,978,641 | B2* | 3/2015 | Buckley | ......... | H02S 40/425 |
| | | | | | 126/652 |
| 9,169,649 | B2* | 10/2015 | Choi | ............ | E04F 10/08 |
| 9,243,816 | B2* | 1/2016 | Keller | ............ | H02S 20/20 |
| 9,303,443 | B2* | 4/2016 | Lucas | ............ | E04F 10/10 |

FOREIGN PATENT DOCUMENTS

| | | | | |
|---|---|---|---|---|
| JP | 2005-142383 A | 6/2005 | | |
| JP | 2010-90701 A | 4/2010 | | |
| JP | 2012-207402 A | 10/2012 | | |
| JP | 2014-145159 A | 8/2014 | | |
| WO | WO-2006119567 A1 * | 11/2006 | ......... | E04B 2/04 |

OTHER PUBLICATIONS

International Search Report issued in International Application No. PCT/JP2016/081622, dated Dec. 20, 2016 (1 page).

* cited by examiner

SOLAR CELL MODULE MOUNTING STRUCTURE AND SOLAR CELL MODULE MOUNTING METHOD

TECHNICAL FIELD

One or more embodiments of the present invention relate to a solar cell module mounting structure for mounting a solar cell module to a wall surface of a building, and relates to a solar cell module mounting method for mounting a solar cell module to a wall surface of a building.

BACKGROUND

In recent years, attention has been paid to a photovoltaic power generation system that generates electric power by energy of sunlight, because of consideration for the environment and safety without risk of releasing radioactivity. In such a photovoltaic power generation system, a large number of solar cell modules are typically installed to perform power generation. As an example, there is known a system formed by mounting a solar cell module to an outer peripheral wall of a building.

As a structure for mounting a solar cell module to an outer peripheral wall of a building, for example, there is a structure disclosed in Patent Document 1.

In the structure disclosed in Patent Document 1, holding members are respectively fixed at positions spaced apart in an up-down direction of a building wall surface, and a solar cell module (solar panel) is fixed by these two holding members. More specifically, the two holding members respectively hold an upper end part and a lower end part of the solar cell module, so that a light receiving surface of the solar cell module is fixed so as to be parallel to an outer peripheral surface (wall surface) of the building.

Here, in this structure, the respective holding members fixed to the building wall surface can hold a lower end part of a solar cell module positioned upper and an upper end part of a solar cell module positioned lower. Accordingly, by arranging a plurality of holding members in parallel at an interval in the up-down direction and fixing the solar cell module between two adjacent holding members, a plurality of solar cell modules can be fixed in a state being in parallel in the up-down direction. Further, by forming a plurality of rows of solar cell modules arranged in parallel in the up-down direction, and arranging them in parallel in a horizontal direction to arrange the solar cell modules in a matrix form, the solar cell modules can be arranged to be spread over outside the building wall surface.

Further, as another structure for mounting a solar cell module to a building wall surface, for example, there is a structure disclosed in Patent Document 2.

In the structure disclosed in Patent Document 2, four sides of a solar cell module are in a state covered with a frame, and its upper frame part is formed with a projected hooking part that protrudes upward, and a groove-like engagement receiving part that opens downward. Furthermore, a lower frame part is also formed with a groove-like engagement receiving part that opens downward. Meanwhile, a vertical material is fixed to an outer wall part of a building, and a bracket is fixed to this vertical material. Then, the bracket is provided with a unit-supporting part protruding upward, in this structure.

In this structure disclosed in Patent Document 2, in fixing the solar cell module to the outer wall of the building, the unit-supporting part of the bracket is in a state fitted into the engagement receiving part formed to the upper frame of the solar cell module. Further, the projected hooking part formed to the upper frame of the solar cell module positioned lower is in a state fitted into the engagement receiving part formed to the lower frame of the solar cell module positioned upper. By doing so, a plurality of solar cell modules can be fixed in a state being in parallel in the up-down direction.

At this time, every solar cell module is fixed so as to be inclined with respect to the building wall surface, while a lower end side is arranged at a position more distant from the building wall surface than an upper end side. That is, the solar cell modules having a light receiving surface inclined such that a distance from the building wall surface is increased toward downward are arranged in parallel in the up-down direction, and a plurality of solar cell modules arranged in parallel are made to function as louvers.

As described above, there are known the mounting structure in which the light receiving surfaces of the respective solar cell modules are fixed so as to be parallel to the building wall surface to be spread over outside the building wall surface, and the mounting structure in which each solar cell module is fixed such that the light receiving surface is inclined with respect to the building wall surface, and a large number of solar cell modules arranged in parallel in the up-down direction are made to function as louvers.

PRIOR ART DOCUMENTS

Patent Documents

Patent Document 1: JP 2010-90701 A
Patent Document 2: JP 2014-145159 A

Here, as described above, when individual solar cell modules are inclined with respect to the building wall surface and arranged in parallel in the up-down direction, a shadow of a solar cell module positioned upper may be formed on a light receiving surface of a solar cell module positioned lower.

More specifically, when the building wall surface is irradiated with sunlight, the wall is irradiated with the sunlight from above the building. At this time, among the solar cell modules arranged in parallel in the up-down direction, in a solar cell module located at an uppermost position, its light receiving surface is irradiated with sunlight to perform power generation. On the other hand, the sunlight made to irradiate from above causes a shadow to be formed below the solar cell module of the uppermost position.

That is, each solar cell module is mounted in a position inclined so as to form a downward slope toward outside, and in a state protruding outwardly and downwardly from the building wall surface just like an eaves. Therefore, the sunlight made to irradiate from above causes a shadow to be formed below the solar cell module.

At this time, the light receiving surface of the solar cell module located second from the top is located at a position downwardly away from a lower face of the solar cell module located at the uppermost position. Therefore, if a shadow is formed below the solar cell module located at the uppermost position, this shadow may be cast over the light receiving surface of the solar cell module located second from the top. That is, when the solar cell module positioned upper and the solar cell module positioned lower are arranged close to each other, the shadow of the solar cell module positioned upper may be formed on the light receiving surface of the solar cell module positioned lower.

This also applies to the second solar cell module from the top and subsequent solar cell modules, and a shadow of an upper solar cell module arranged adjacently in the up-down direction may be formed on a light receiving surface of a lower solar cell module.

Here, if a shadow is formed over a wide range on the light receiving surface of the solar cell module, the power generation performance of the photovoltaic power generation system is greatly impaired. In other words, because power cannot be generated in a part formed with a shadow, a power generation amount decreases as an area of the shadow formed on the light receiving surface increases, resulting in greatly impaired power generation performance.

Therefore, as one measure to prevent a shadow of a large area from being formed on the light receiving surface, a measure of extending a distance between the individual solar cell modules arranged in parallel in the up-down direction can be considered. That is, it is a measure to arrange two solar cell modules arranged adjacently in the up-down direction, at positions largely separated in the up-down direction, so that a shadow of a solar cell module positioned at an upper side does not reach a light receiving surface of a solar cell module positioned at a lower side.

However, according to such a measure, the number of solar cell modules that can be mounted to the entire building wall surface may be reduced.

More specifically, a region that can be secured for installation of the solar cell module on the building wall surface is limited, and from the viewpoint of increasing a power generation amount in the entire photovoltaic power generation system, it is desirable to install many solar cell modules as much as possible within this limited region. However, extending the distance between the solar cell modules arranged in parallel in the up-down direction also increases an area of a region formed between the solar cell modules. Then, if no solar cell module is mounted to this region, an area occupied by a region not mounted with the solar cell module is increased in the entire region assured to be mounted with the solar cell module. Therefore, the number of solar cell modules that can be mounted to the building wall surface is reduced, as compared with a case where the distance between the solar cell modules is shorter.

Naturally, such reduction of the number of solar cell modules mounted to the entire building wall surface also reduces a power generation amount generated by the entire photovoltaic power generation system. In this case, despite the fact that a shadow of the solar cell module located on the upper side is not formed on the light receiving surface of each solar cell module, the power generation performance may be degraded as a result.

One or more embodiments of the present invention provide a solar cell module mounting structure and a solar cell module mounting method, in which individual solar cell modules can exhibit high power generation performance without extension of a distance between the individual solar cell modules more than necessary.

SUMMARY

As a result of intensive studies, the inventor has found that there is a correlation shown by Expression 1 below, among an inclination angle of a solar cell module, a length in an inclination direction of the solar cell module, and a distance between individual solar cell modules arranged in parallel in an up-down direction.

In one or more embodiments, one aspect of the present invention completed on the basis of such findings is a solar cell module mounting structure (or "solar cell module mounting system") for fixing a solar cell module to a side wall part (or "side wall") of a building, the solar cell module including a first solar cell module, wherein the first solar cell module includes a first side and a second side opposing to each other, the first side being close to the side wall part of the building, the second side being arranged at a position lower than the first side and/or at a position outwardly away from the side wall part of the building, wherein a plurality of the first solar cell modules are arranged vertically; and wherein a relationship of Expression 1 below is satisfied, with a definition of θ1 as an angle formed by a light receiving surface of the first solar cell module and a horizontal plane, and l1 as a distance from the first side of the first solar cell module positioned upper to the first side of the first solar cell module positioned lower, and with a condition of a distance between the first and second of the first solar cell module sides equal to 1.

$$16 \leq \theta 1 - (32/l1) \leq 56 \qquad \text{[Expression 1]}$$

According to the solar cell module mounting structure of this aspect, without extension of a distance between the solar cell modules arranged in parallel at an interval in the up-down direction more than necessary, individual solar cell modules arranged in parallel in the up-down direction can exhibit high power generation performance.

This aspect includes a second solar cell module on the side wall part of the building, wherein the second solar cell module is arranged between the first side of the first solar cell module positioned upper and the first side of the first solar cell module positioned lower, and wherein the second solar cell module is fixed such that a light receiving surface of the second solar cell module is parallel to an outer peripheral surface of the side wall part of the building.

According to this aspect, it is possible to effectively utilize sunlight made to irradiate the wall surface between the solar cell modules arranged in parallel at an interval in the up-down direction. Accordingly, when a photovoltaic power generation system is constructed, a power generation amount generated by the entire photovoltaic power generation system can be improved.

In one or more embodiments, a total region between the first side of the first solar cell module positioned upper and the first side of the first solar cell module positioned lower consists of: a first region; and a second region, the first region being a region where an annual integrated amount of solar radiation per unit area is equal to or larger than a predetermined amount, the second region being a region other than the first region in the total region, and an upper end part ("upper end") of the second solar cell module is close to a boundary part ("boundary") between the first region and the second region.

According to this aspect, it is possible to reduce an area of a shadow formed on the light receiving surface of the second solar cell module mounted between the first solar cell modules arranged in an inclined position in parallel at an interval in the up-down direction. That is, a power generation amount per area of the light receiving surface of the second solar cell module can be improved.

With a definition of S4 as an annual integrated amount of solar radiation per unit area, the first region may have an annual integrated amount of solar radiation per unit area equal to 0.9×S4 or more while the second region has an annual integrated amount of solar radiation per unit area less than 0.9×S4.

Further, the upper end part of the second solar cell module may be arranged between a part upwardly apart from the boundary part by a predetermined distance 1x and a part downwardly apart from the boundary part by a predetermined distance $1x$, while $1x$ satisfies Expression 16 below.

$$lx = l1 \times a \quad \text{[Expression 16]}$$

(wherein a is a constant of 0.05 or more to 0.1 or less)

In the aspect described above, it may be possible that the annual integrated amount of solar radiation is a sum of an annual integrated amount of solar radiation of direct light and an annual integrated amount of solar radiation of scattered light.

In this aspect, it may be possible that all of the first solar cell modules are members having a rectangular flat plate shape with the two sides being long sides.

In one or more embodiments, another aspect of the present invention is a solar cell module mounting method for fixing a solar cell module to a side wall part of a building, the solar cell module including a first solar cell module, wherein the first solar cell module includes a first side and a second side opposing to each other, the first side being close to the side wall part of the building, the second side being arranged at a position lower than the first side and/or at a position outwardly away from the side wall part of the building, wherein the solar cell module mounting method fixes the first solar cell modules in parallel at an interval in an up-down direction, and wherein the solar cell module mounting method includes a first step of fixing the first solar cell module so as to satisfy a relationship of Expression 1 below, with a definition of θ1 as an angle formed by a light receiving surface of the first solar cell module and a horizontal plane, and l1 as a distance from the first side of the first solar cell module positioned upper to the first side of the first solar cell module positioned lower, and with a condition of a distance between the first and second sides of the first solar cell equal to 1.

$$16 \leq \theta 1 - (32/l1) \leq 56 \quad \text{[Expression 1]}$$

In this aspect as well, individual solar cell modules arranged in parallel in the up-down direction can exhibit high power generation performance without extension of a distance between the solar cell modules arranged in parallel at an interval in the up-down direction more than necessary.

The method may further include a second step of fixing a second solar cell module between the first side of the first solar cell module positioned upper and the first side of the first solar cell module positioned lower, the second step of fixing the second solar cell module such that a light receiving surface is parallel to an outer peripheral surface of the side wall part of the building, wherein a total region between the first side of the first solar cell module positioned upper and the first side of the first solar cell module positioned lower consists of: a first region; and a second region, the first region being a region where an annual integrated amount of solar radiation per unit area is equal to or larger than a predetermined amount, the second region being a region other than the first region in the total region, and wherein an upper end part of the second solar cell module is close to a boundary part between the first region and the second region.

In this aspect, it is possible to effectively utilize sunlight made to irradiate the wall surface between the first solar cell modules arranged in parallel at an interval in the up-down direction. Accordingly, when a photovoltaic power generation system is constructed, a power generation amount generated by the entire photovoltaic power generation system can be improved.

It is also possible to reduce an area of a shadow formed on the light receiving surface of the second solar cell module arranged between the first solar cell modules, and a power generation amount per area of the light receiving surface of the second solar cell module can be improved.

According to one or more embodiments of the present invention, when a photovoltaic power generation system is constructed by mounting a plurality of solar cell modules to a wall surface of a building, individual solar cell modules can exhibit high power generation performance: without extension of a distance between the solar cell modules more than necessary.

BRIEF DESCRIPTION OF DRAWINGS

FIGS. 7A and 7B are views schematically showing a modeled relationship among the inclination angle of the inclined installation type module, the interval between two inclined installation type modules arranged adjacently in the up-down direction, and an angle and a length of other parts of the solar cell module mounting structure, in which FIG. 7A shows a position of a point x when a view factor K of the sky viewed from the point x is a positive value, and FIG. 7B shows a position of the point x when the view factor K of the sky viewed from the point x is a negative value.

FIGS. 9A and 9B are graphs showing a result of a first simulation, showing a relationship among the inclination angle of the inclined installation type module, the interval between two inclined installation type modules, and an integrated amount of solar radiation per area of the inclined installation type module, in which FIGS. 9A and 9B show a relationship between inclination angles of the inclined installation type module and other values, in which the inclination angles are different from those in FIGS. 8A and 8B, and FIGS. 9A and 9B each show a relationship between different inclination angles of the inclined installation type module and other values.

DETAILED DESCRIPTION OF THE EMBODIMENTS

Hereinafter, a solar cell module mounting structure 1 (hereinafter also simply referred to as a mounting structure 1) according to one or more embodiments of the present invention will be described in detail with reference to the drawings. It is noted that, in the following description, a front-back direction, an up-down direction, and a right-left direction are described based on a normal installation state illustrated in FIG. 1, unless otherwise specified.

Figure 1:
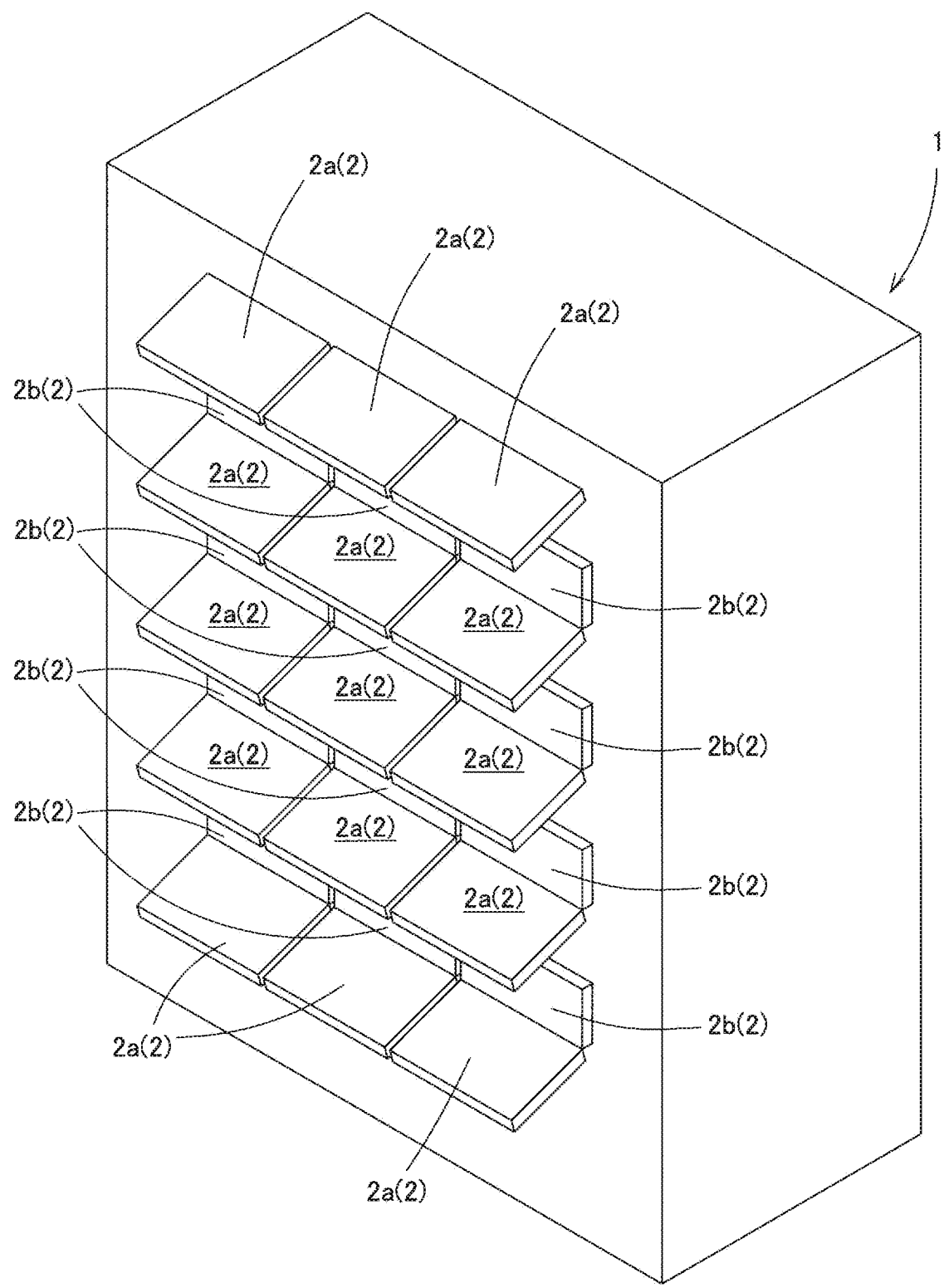
FIG. 1 is a perspective view showing a solar cell module mounting structure according to one or more embodiments of the present invention.

As shown in FIG. 1, the mounting structure 1 of one or more embodiments of the present invention is formed by fixing a solar cell module 2 to a wall surface of a building (a building which is a high-rise building) via a publicly known fixing member (not shown).

More specifically, there is fixed an inclined installation type solar cell module 2 (first solar cell module, hereinafter also referred to as an inclined installation type module 2a) fixed in a posture with a light receiving surface inclined with respect to a side wall surface of the building. Furthermore, the mounting structure 1 is formed by fixing as required a vertically installed solar cell module 2 (second solar cell module, hereinafter also referred to as a vertical installation type module 2b) fixed with a light receiving surface parallel to the side wall surface of the building.

Both the inclined installation type module 2a and the vertical installation type module 2b are provided with a plate-like solar cell panel, and are formed such that an overall outer shape is a substantially rectangular flat plate shape.

Moreover, this solar cell panel has a structure similar to that of a publicly known solar cell panel, and is an integrated solar cell formed by sealing a solar cell provided with a photoelectric conversion element between a back surface sealing material and a glass substrate forming the light receiving surface.

Further, although not particularly limited, it may be a solar cell module 2 that has been subjected to anti-glare treatment for suppressing reflection of sunlight on its surface. Furthermore, it may be a solar cell module 2 in which, as in a so-called dye-sensitized solar cell, various colors (e.g., colors such as red, yellow, and green in addition to normal black or dark blue) are caused to appear on a front side, and the colors caused to appear can be visually recognized in visual inspection.

Figure 2:
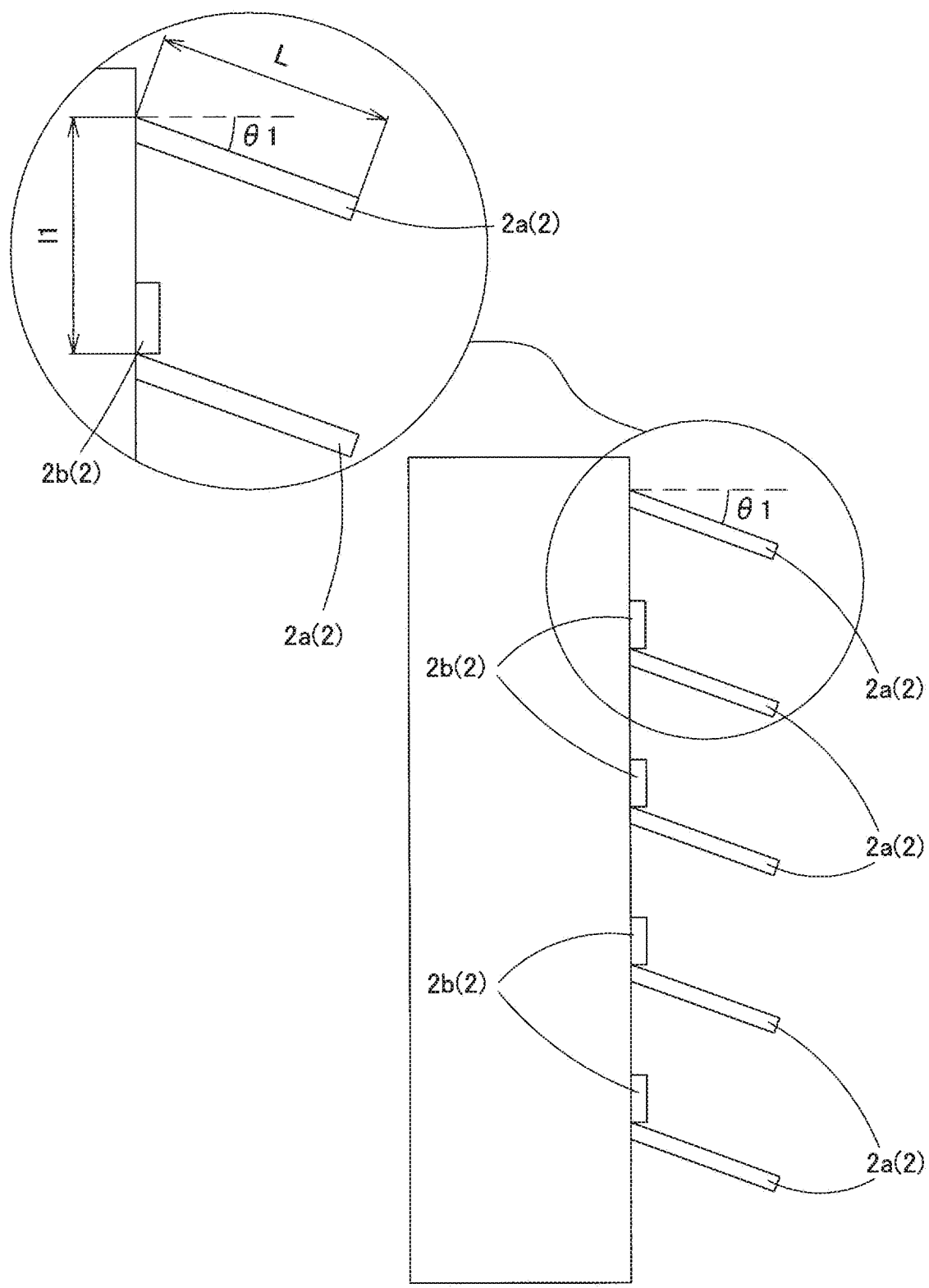
FIG. 2 is an explanatory view showing a state in which the solar cell module mounting structure of FIG. 1 is viewed front a side.

As shown in FIGS. 1 and 2, the inclined installation type module 2a has an upper side, which is one side of two sides opposing to each other, close to the side wall surface of the building, and a lower side, which is another one side, arranged at a position outwardly and downwardly away from the upper side. In other words, the inclined installation type module 2a is fixed in a cantilever manner, and in a state protruding outwardly and downwardly from the side wall surface of the building.

Here, in the inclined installation type module 2a of one or more embodiments of the present invention, the inclined installation type module 2a is installed so as to satisfy a relationship of Expression 1 below when an inclination angle of the inclined installation type module 2a is θ1, and a distance from the upper side to the lower side of the inclined installation type module 2a is 1, and an interval in the up-down direction of two inclined installation type modules 2a arranged adjacently is l1 (see FIG. 2).

$$16 \leq \theta 1 - (32/l1) \leq 56 \qquad \text{[Expression 1]}$$

More specifically, the "inclination angle of the inclined installation type module 2a" is an angle formed between the light receiving surface of the inclined installation type module 2a and a horizontal plane, in other words, it is also an angle formed between a straight line extending along the protruding direction of the inclined installation type module 2a and the horizontal plane.

The "distance from the upper side to the lower side of the inclined installation type module 2a" is a distance between two sides opposing to each other of the inclined installation type module 2a, which is also a distance between two long sides, and also a length in the protruding direction. That is, it is a distance of a part indicated by L in FIG. 2.

Furthermore, the "interval in the up-down direction of the inclined installation type module 2a" is a length from an upper end (upper side) of the inclined installation type module 2a positioned upper to an upper end (upper side) of the inclined installation type module 2a positioned lower in the up-down direction (a direction perpendicular to the horizontal plane).

In one or more embodiments of the present invention, the upper side and the lower side of the inclined installation type module 2a are long sides, while sides extending in the protruding direction and orthogonal to these long sides are short sides. However, one or more embodiments of the present invention is not limited thereto. For example, it is conceivable that the upper side and the lower side of the inclined installation type module 2a are short sides, while the sides extending in the protruding direction and orthogonal to these short sides are the long sides. In addition, it is conceivable that the length of the upper side and the lower side and the length of the sides extending in the protruding direction and orthogonal these upper side and lower side are made to have an equal length so that the inclined installation type module 2a is square in plan view.

Arranging so as to satisfy Expression 1 as described above enables an area of a shadow formed on the light receiving surface of each inclined installation type module 2a to be suppressed to a narrow range without extension of the length l1 more than necessary. Accordingly, it is possible to achieve a higher value of an integrated amount of solar radiation of each inclined installation type module 2a throughout a year As shown in FIGS. 1 and 2, the vertical installation type module 2b is mounted between two inclined installation type modules 2a arranged adjacently in the up-down direction. This vertical installation type module 2b is attached to the side wall surface of the building, and the lower side is arranged at a position vertically and downwardly away from the upper side.

Here, this vertical installation type module 2b is mounted based on calculation of a solar radiation amount to be made to irradiate a part located between the two inclined installation type modules 2a arranged adjacently in the up-down direction, in the side wall surface of the building, by a simulation performed in advance (details will be described later).

For finding Expression 1 described above, the inventor has performed a simulation to calculate, by computation, an integrated amount of solar radiation throughout a year of the solar cell module 2 in various combinations of the inclination angle ($\theta 1$) and the interval (l1), by allowing the inclination angle ($\theta 1$) of the inclined installation type module 2a and the interval (l1) in the up-down direction of the inclined installation type module 2a to separately vary.

In addition, a simulation has been performed to calculate, by computation, an amount of solar radiation irradiated on a part located between the two inclined installation type modules 2a, in the side wall surface of the building.

Hereinafter, the simulation performed by the inventor will be described in detail.

In each of the following simulations, sunlight entering the light receiving surface of the solar cell module 2 was classified as direct light that reaches directly from the sun, and scattered light generated by sunlight being scattered by air molecules, clouds, aerosol particles.

Then, in a first simulation, computation was performed to individually calculate an integrated amount of solar radiation of direct light made to irradiate the inclined installation type module 2a throughout a year, and an integrated amount of solar radiation of scattered light made to irradiate the inclined installation type module 2a throughout a year. Then, these values were summed to calculate an integrated amount of solar radiation of the inclined installation type module 2a. At this time, both the integrated amount of solar radiation of direct light and the integrated amount of solar radiation of scattered light were an integrated amount of solar radiation made to irradiate a part not having a shadow of the inclined installation type module 2a positioned upper, in the surface forming the light receiving surface of the inclined installation type module 2a.

In addition, in the first simulation, an integrated amount of solar radiation per installation area of the inclined installation type module 2a was calculated based on this calculated integrated amount of solar radiation.

Further, in a second simulation, computation was performed to individually calculate an integrated amount of solar radiation of direct light irradiated throughout a year to a part located between two inclined installation type modules 2a arranged adjacently in the up-down direction, in the side wall surface of the building, and an integrated amount of solar radiation of scattered light irradiated on the same part throughout a year. Then, these values were summed to calculate an integrated amount of solar radiation in the same part. in this second simulation as well, the integrated amount of solar radiation of direct light and the integrated amount of solar radiation of scattered light were the integrated amount of solar radiation irradiated on a part not having a shadow of the inclined installation type module 2a positioned upper.

[First Simulation]

First, prior to the calculation of the integrated amount of solar radiation of direct light, an incident angle $\theta A$ of direct light made to irradiate the inclined installation type module 2a was calculated. Next, based on the calculated incident angle $\theta A$, a proportion of an area of a part irradiated with direct light to an area of a surface forming the light receiving surface of the inclined installation type module 2a was calculated, that is, a ratio of an area excluding a part having a shadow of another inclined installation type module 2a positioned upper (hereinafter also referred to as shadow) from the entire receiving surface was calculated.

Figure 3:
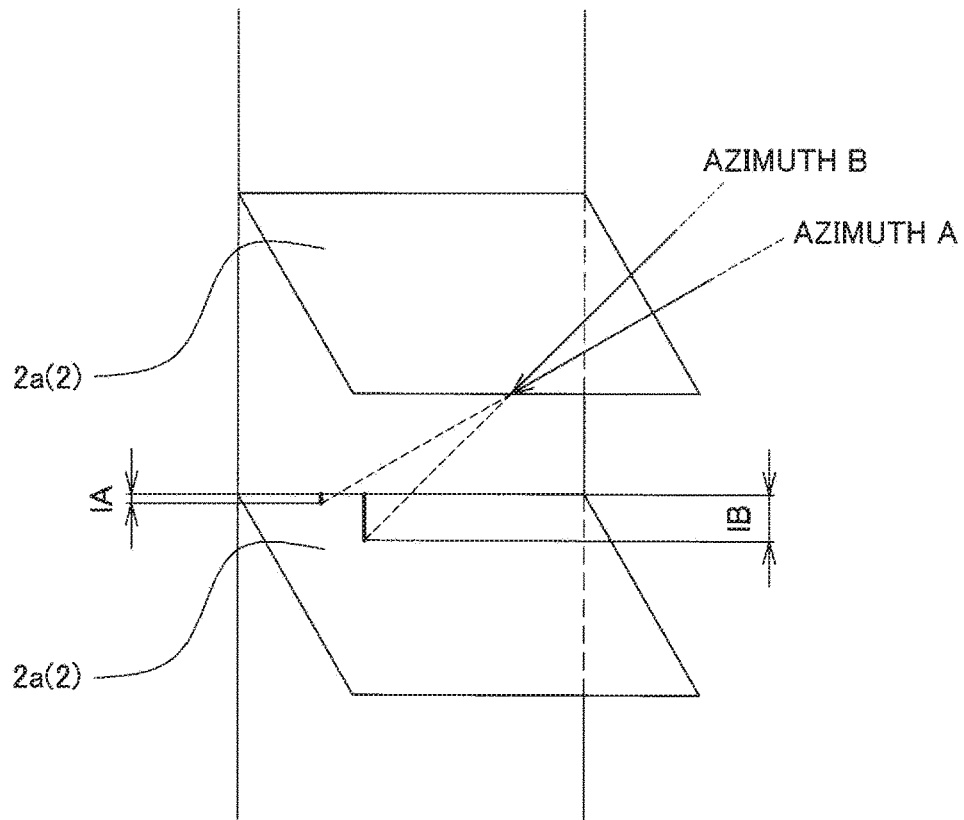
FIG. 3 is an explanatory view showing a state in which a length of a shadow formed on an inclined installation type module varies depending on an azimuth of the sun.

First, for calculating the incident angle $\theta A$ of direct light, calculation was performed to obtain an incident angle $\theta A$ of direct light when projected on a vertical plane perpendicularly crossing the light receiving surface of the inclined installation type module 2a, since a length of a shadow (e.g., a length 1A, a length 1B) formed on the surface of the inclined installation type module 2a varies depending on an azimuth of the sun (e.g., an azimuth A, an azimuth B) as shown in FIG. 3, even if the solar altitude is the same.

Figure 4:
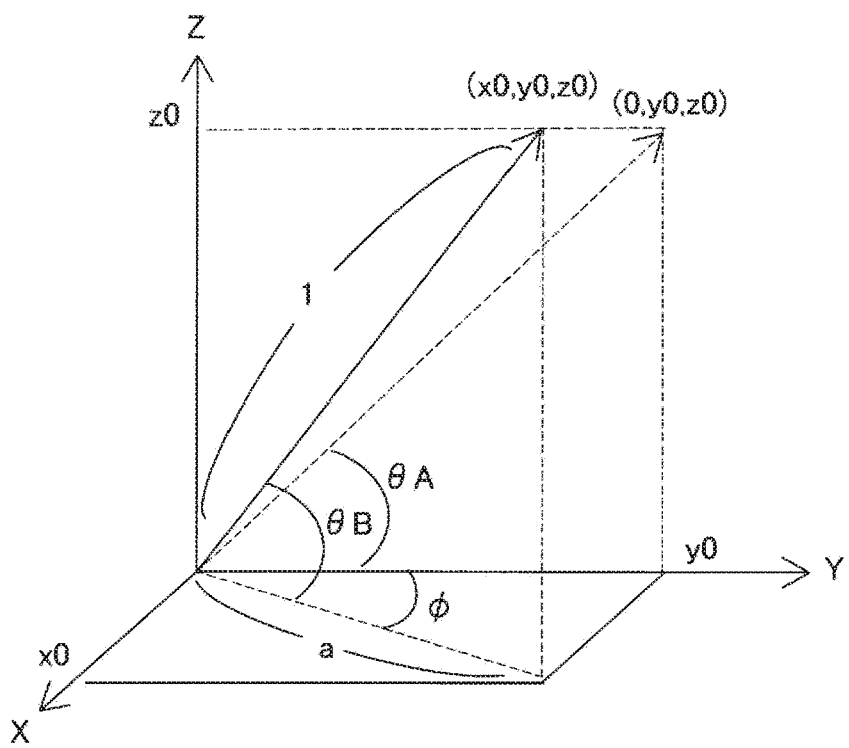
FIG. 4 is a view schematically showing a modeled relationship among an incident angle of direct light that is made to irradiate a light receiving surface of the inclined installation type module, an elevation of the sun, and an azimuth angle. Hereupon, the incident angle of the direct light is defined as an angle projected on a vertical plane perpendicularly crossing the light receiving surface of the inclined installation type module.

That is, when a sun elevation was $\theta B$ and an azimuth angle with a south side at 0° was $\varphi$, the incident angle $\theta A$ was calculated by the following Expression 2 from a model shown in FIG. 4.

$$a = \cos\theta B \quad\quad\quad\quad [\text{Expression 2}]$$
$$z0 = \sin\theta B$$
$$y0 = a \times \cos\varphi = \cos\theta B \times \cos\varphi$$
$$\tan\theta A = z0 \div y0 = \sin\theta B \div (\cos\theta B \times \cos\varphi)$$
$$\theta A = \tan^{-1}\frac{\sin\theta B}{\cos\theta B \times \cos\varphi}$$

Further, using the calculated incident angle $\theta A$, a length l2 in the protruding direction of a part formed having a shadow in the inclined installation type module 2a positioned lower was calculated.

Figure 5:
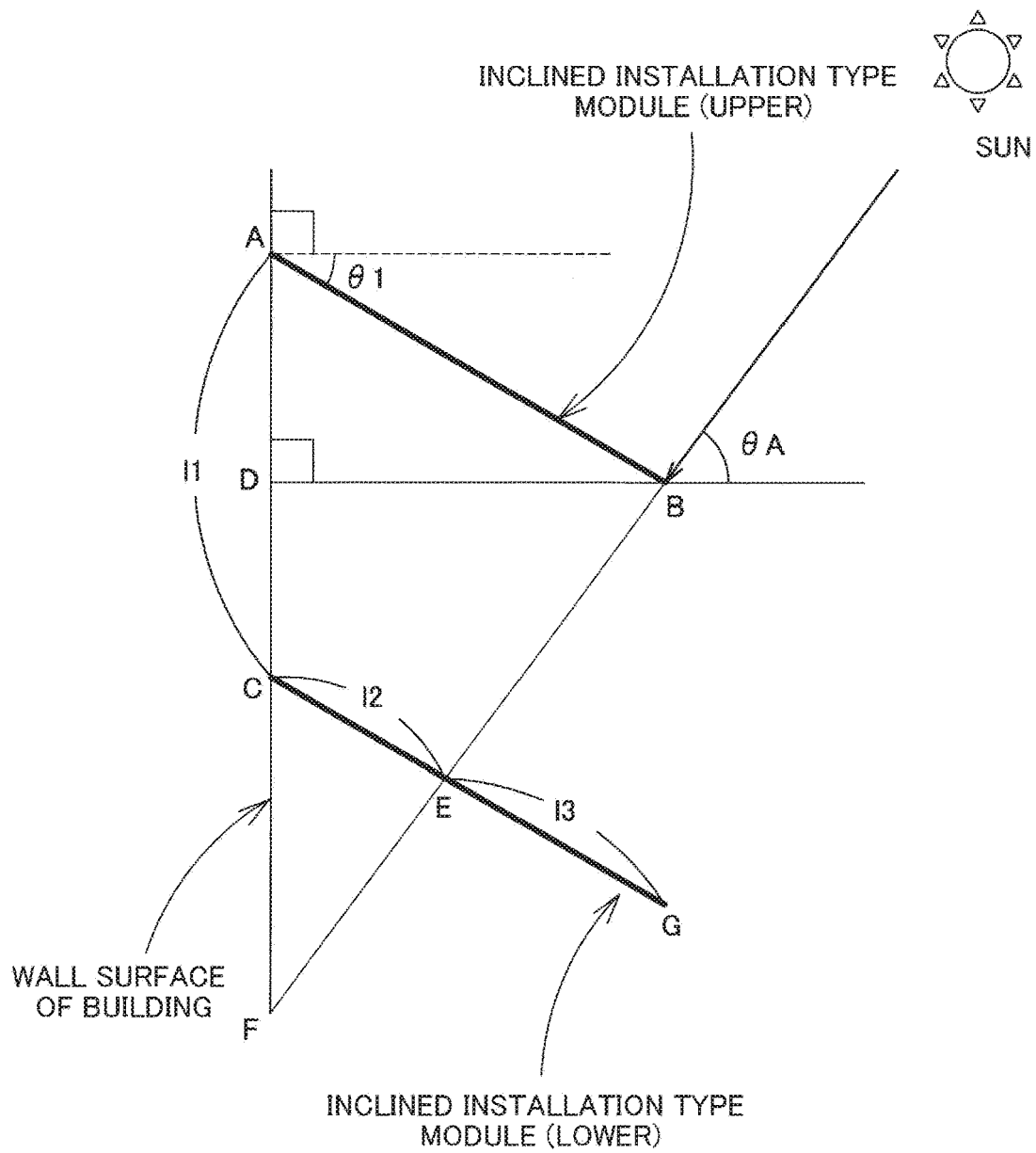
FIG. 5 is a view schematically showing a modeled relationship among the incident angle of direct light, an inclination angle of the inclined installation type module, an interval between two inclined installation type modules arranged adjacently in the up-down direction, a length of forming a shadow on the light receiving surface of the inclined installation type module positioned lower, and a length of not forming a shadow on the light receiving surface of the inclined installation type module positioned lower.

That is, when the inclination angle of the inclined installation type module 2a was $\theta 1$, the length of the inclined installation type module 2a in the protruding direction was 1 (length from the upper side to the lower side), and the interval in the up-down direction of the two inclined installation type modules 2a was l1, l2 was calculated by the following Expression 3 from a model shown in FIG. 5.

It should be noted that, in the following Expression 3, a side AD indicates a length of the side AD when the length of the inclined installation type module 2a in the protruding direction is 1. Moreover, other sides also similarly show a length based on the length of the inclined installation type module 2a in the protruding direction as 1.

$$\text{side } AD = \sin\theta 1 \quad\quad\quad\quad [\text{Expression 3}]$$
$$\text{side } DB = \cos\theta 1$$
$$\text{side } DF = \text{side } DB \times \tan\theta A = \cos\theta 1 \times \tan\theta A$$
$$\text{side } AC + \text{side } CF = \text{side } AD + \text{side } DF$$
$$\text{side } CF = \text{side } AD + \text{side } DF - \text{side } AC =$$
$$\quad\quad\quad\quad \sin\theta 1 + \cos\theta 1 \times \tan\theta A - l1$$
$$1: l2 = l1 + \text{side } CF: \text{side } CF$$

-continued $$I2 \times (I1 + \text{side } CF) = \text{side } CF$$

$$I2 = \frac{\text{side } CF}{I1 + \text{side } CF} = \frac{\sin\theta1 + \cos\theta1 \times \tan\theta A - I1}{\sin\theta1 + \cos\theta1 \times \tan\theta A}$$

Further, using the calculated l2, a length l3 in the protruding direction of a part not having a shadow in the inclined installation type module 2a positioned lower was calculated by the following Expression 4 from the model shown in FIG. 5.

$$l3 = 1 - l2 = \frac{l1}{\sin\theta1 + \cos\theta1 \times \tan\theta A} \quad \text{[Expression 4]}$$

By using l2 and l3 thus calculated, a ratio of the area of the part irradiated with direct light to an area of the entire surface (product of the lengths of the long side and the short side of the inclined installation type module 2a) was calculated, when the surface forming the light receiving surface of the inclined installation type module 2a positioned lower was regarded as the entire surface.

Further, an inclined-plane direct solar radiation amount S2 was calculated by using a horizontal-plane direct solar radiation amount S1 observed in advance. Since the horizontal-plane direct solar radiation amount S1 is a value obtained by subtracting a horizontal-plane diffuse solar radiation amount from a horizontal-plane global solar radiation amount, the horizontal-plane global solar radiation amount and the horizontal-plane diffuse solar radiation amount may be observed, and the horizontal-plane direct solar radiation amount S1 may he calculated based on them without observing the horizontal-plane direct solar radiation amount S1.

Figure 6:
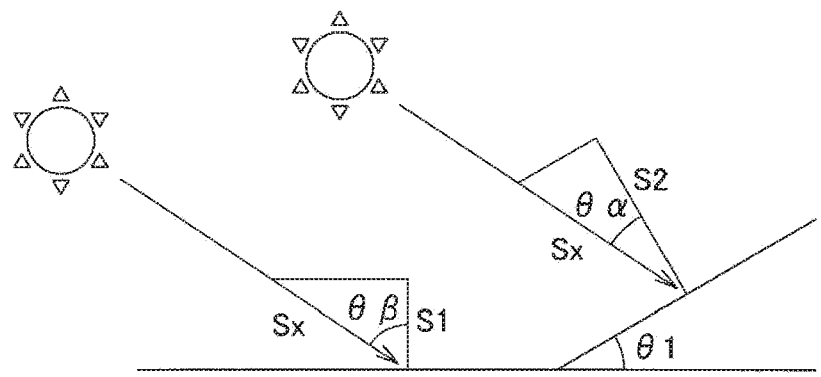
FIG. 6 is a view schematically showing a modeled relationship between a horizontal-plane direct solar radiation amount and an inclined-plane direct solar radiation amount.

More specifically, the horizontal-plane direct solar radiation amount S1 and the inclined-plane direct solar radiation amount S2 satisfy a relationship of the following Expression 5 from a model shown in FIG. 6.

$$S2 = S1 \times \cos\theta\alpha \div \cos\theta\beta \quad \text{[Expression 5]}$$

Therefore, obtaining cos θα and cos θβ in Expression 5 allows calculation of the inclined-plane direct solar radiation amount S2.

These cos θα and cos θβ satisfy a relationship of the following Expression 6, when an angle of the inclined surface (the inclination angle of the inclined installation type module 2a) is θ1 (see, FIG. 6), an azimuth angle is φ a latitude of an observation point is φA, a sun declination is δ, and an hour angle is ω. That is, cos θβ is sin θB when a sun elevation is θB, and satisfies the relationship of the following Expression 6 from a formula for solar altitude.

$$\cos\theta\beta = \sin\phi A \times \sin\delta + \cos\phi A \times \cos\delta \times \cos\omega \quad \text{[Expression 6]}$$

$$\cos\theta\alpha = (\sin\phi A \times \cos\theta1 - \cos\phi A \times \sin\theta1 \times \cos\phi) \times \sin\delta +$$
$$(\cos\phi A \times \cos\theta1 + \sin\phi A \times \sin\theta1 \times \cos\phi) \times$$
$$\cos\delta \times \cos\omega + \cos\delta \times \sin\theta1 \times \sin\phi \times \sin\omega$$

Further, the sun declination δ in the Expression 6 can be calculated by the following Expression 7. Note that Γ in Expression 7 is a value that expresses a position of the Earth on the elliptical orbit by the radian, and can be calculated by Expression 8 by using a serial number dn when January 1 is set to 1.

$$\delta = 0.006918 - 0.399912\cos\Gamma + \quad \text{[Expression 7]}$$
$$0.070257\sin\Gamma - 0.006758\cos2\Gamma + 0.000908\sin2\Gamma$$

$$\Gamma = \frac{2\pi(dn-1)}{365} \quad \text{[Expression 8]}$$

Furthermore, the hour angle ω in Expression 6 can be calculated by the following Expression 9, when an equation of time is Et. The equation of time Et can be calculated by the following Expression 10. Note that Γ in Expression 10 is same as that in the above Expression 7.

$$\omega = 15 \times (\text{Japan standard time}(\text{Longitude of observation point}/15 - 9) + Et - 12) \quad \text{[Expression 9]}$$

$$Et = (0.0172 + 0.4281\cos\Gamma - 7.3515\sin\Gamma - 3.3495\cos 2\Gamma - 9.3619\sin 2\Gamma) \div 60 \quad \text{[Expression 10]}$$

Based on the above, the inclined-plane direct solar radiation amount S2 was calculated from the horizontal-plane direct solar radiation amount S1 and Expressions 5 to 10. Then, the integrated amount of solar radiation of direct light was calculated from the area, which was calculated as described above, of the part irradiated with direct light of the inclined installation type module 2a, and the inclined-plane direct solar radiation amount S2.

Next, a calculation method of the integrated amount of solar radiation of scattered light will be described.

First, by subtracting the inclined-plane direct solar radiation amount S2, which was calculated as described above, from the inclined-plane solar radiation amount measured in advance, an inclined-plane diffuse solar radiation amount S3 was obtained.

Further, by obtaining a view factor K as described below, an area of a part irradiated with scattered light in the inclined installation type module 2a was calculated.

Figure 7A:
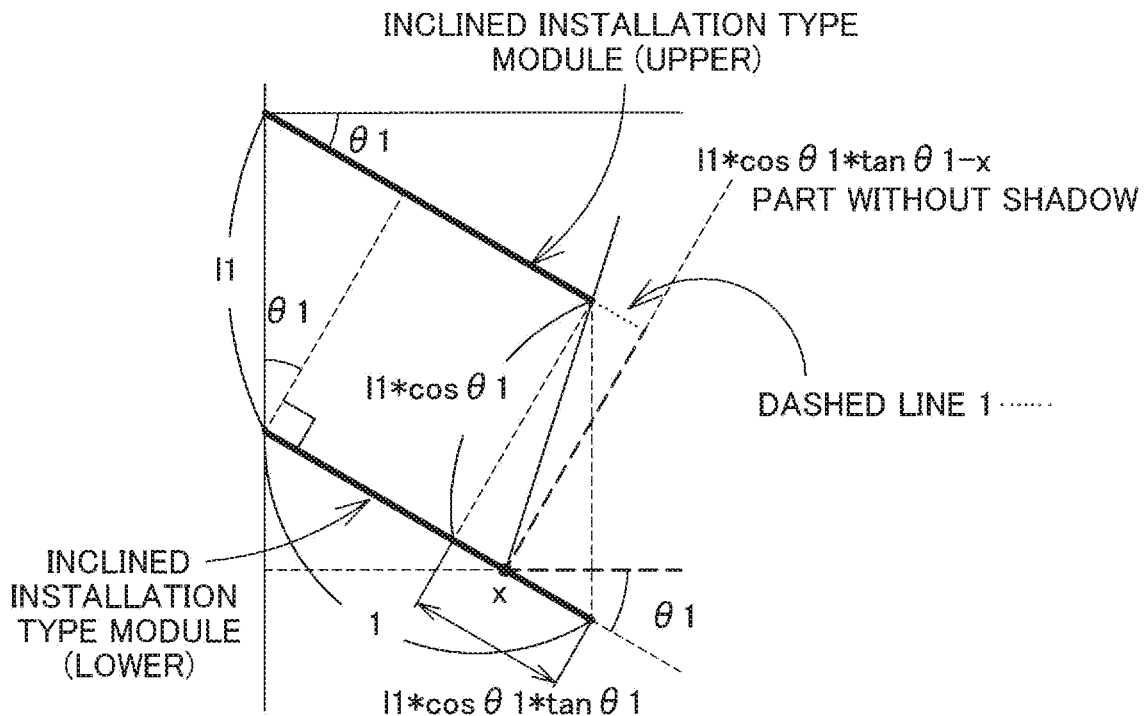
Figure 7B:
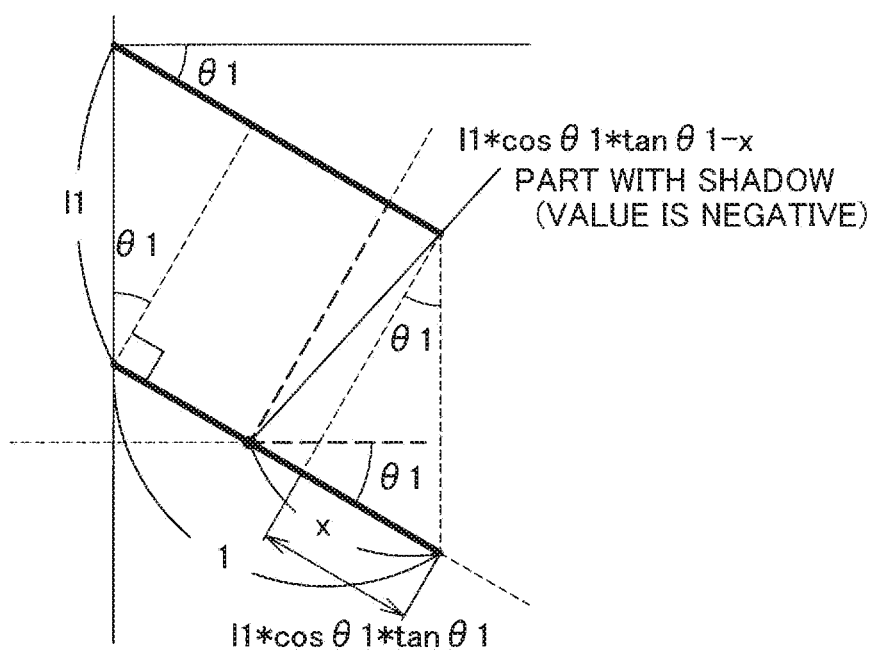
Figure 8A:
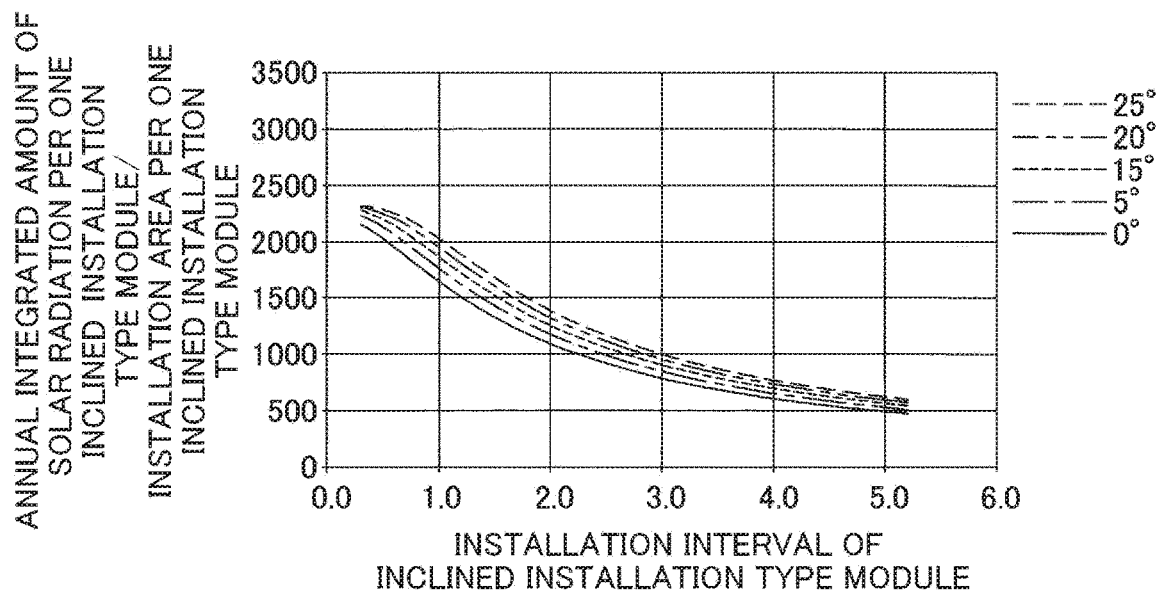
FIGS. 8A and 8B are graphs showing a result of a first simulation, showing a relationship among the inclination angle of the inclined installation type module, the interval between two inclined installation type modules, and an integrated amount of solar radiation per area of the inclined installation type module, in which FIGS. 8A and 8B each show a relationship between different inclination angles of the inclined installation type module and other values.
Figure 8B:
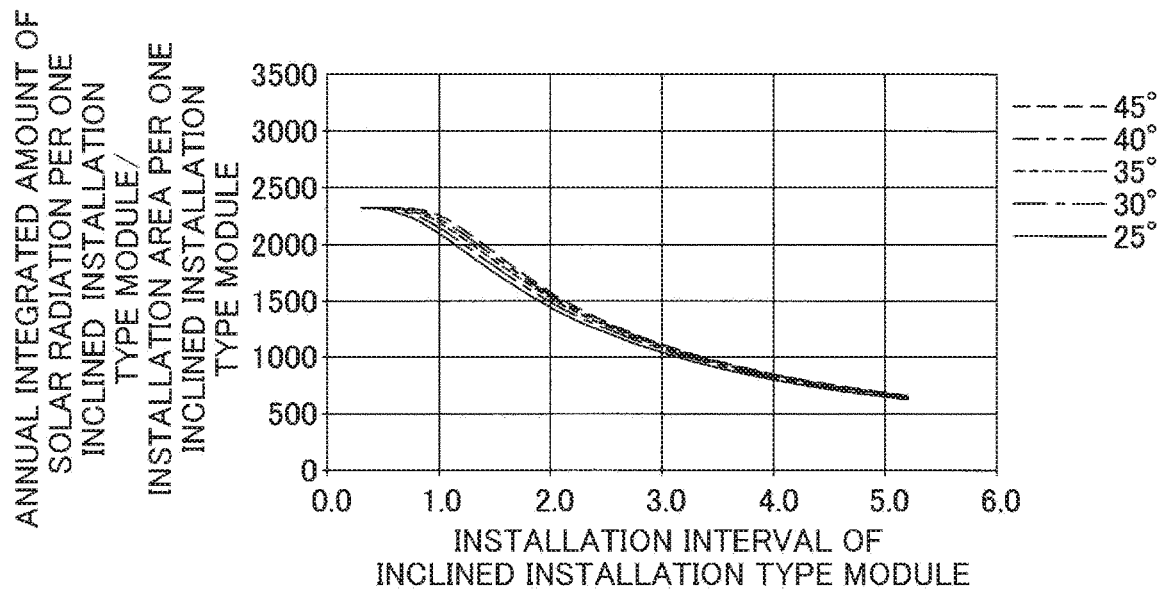
Figure 9A:
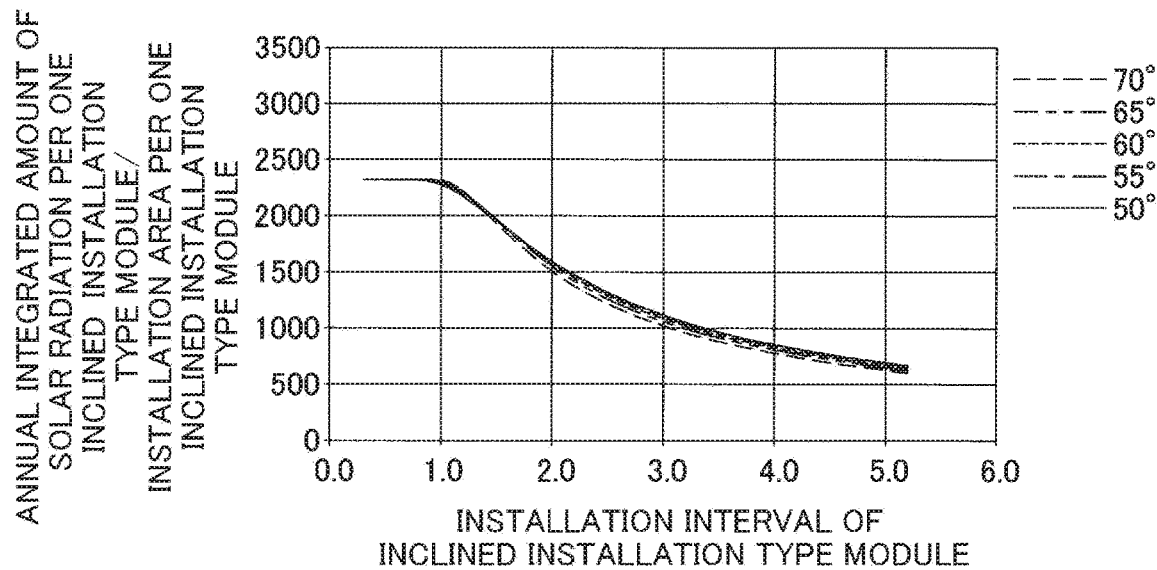
Figure 9B:
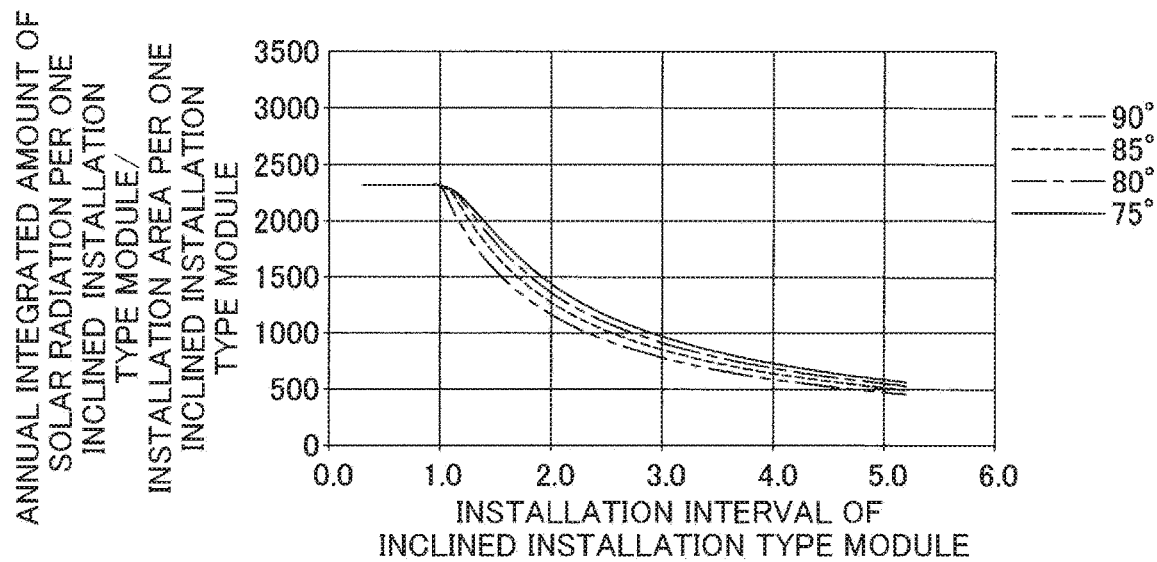

As shown in FIGS. 7A and 7B, assuming that sunlight is made to irradiate from a half of the sky, the view factor viewed from a point x is cos θ1/2 in the absence of the inclined installation type module 2a positioned upper Consequently, since a part shown by a dashed line 1 in FIG. 7A is visible, cos θ1/2+K is obtained when the view factor of the part indicated by the dashed line 1 is K.

Meanwhile, a view factor K' is given by the following Expression 11 when viewing a horizontal rectangular prism having a distance h from a certain point and lengths a and b of sides.

$$K' = \frac{1}{2\pi}\left(\frac{aX}{\sqrt{a^2+h^2}} + \frac{bY}{\sqrt{b^2+h^2}}\right) \quad \text{[Expression 11]}$$

Wherein $$\tan X = \frac{b}{\sqrt{a^2+h^2}}, \tan Y = \frac{a}{\sqrt{b^2+h^2}}$$

Therefore, if this Expression 11 is applied to the part indicated by the dashed line 1 in FIG. 7A, the view factor K can be calculated from the following Expression 12. In this simulation, ∞ is calculated as a value of 10 raised to the power of 150, and the same applies to Expression 15 described later.

$$a = \infty$$

$$b = l1 \times \cos \theta1 \times \tan \theta1 - x$$

$$h = l1 \times \cos \theta1$$

$$K = 2 \times K' \qquad \text{[Expression 12]}$$

Based on the above, the view factor K was calculated from Expressions 11 and 12, and the area of the part irradiated with scattered light in the inclined installation type module 2a was calculated. Then, the integrated amount of solar radiation of scattered light was calculated from the inclined-plane diffuse solar radiation amount S3 and the area of the part irradiated with scattered light in the inclined installation type module 2a.

Further, a sum of the integrated amount of solar radiation of direct light and the integrated amount of solar radiation of scattered light, which were calculated as described above, was regarded as an annual integrated amount of solar radiation per one inclined installation type module 2a. Further, a product of the interval l1 in the up-down direction of the two inclined installation type modules 2a and the long side (the upper side or the lower side) of the inclined installation type module 2a was calculated, and the product was regarded as an installation area per one inclined installation type modules 2a.

Then, at a predetermined observation point, a value of "annual integrated amount of solar radiation per one inclined installation type module 2a"/"installation area per one inclined installation type module 2a" in each combination was calculated, when the interval l1 in the up-down direction of the two inclined installation type modules 2a and the inclination angle θ1 of the inclined installation type module 2a were allowed to individually vary.

As a result, a result shown in Table 1, FIGS. 8A and 8B, and FIGS. 9A and 9B was obtained. Then, from the obtained result of the first simulation, the relationship of Expression 1 above was found.

TABLE 1

| | | Annual integrated amount of solar radiation per one inclined installation type module/installation area per one inclined installation type module | | | | | | | | | | | | | | | | | | |
|---|---|---|---|---|---|---|---|---|---|---|---|---|---|---|---|---|---|---|---|---|
| | | Installation angle of inclined installation type module | | | | | | | | | | | | | | | | | | |
| | | 0° | 5° | 10° | 15° | 20° | 25° | 30° | 35° | 40° | 45° | 50° | 55° | 60° | 65° | 70° | 75° | 80° | 85° | 90° |
| Installation interval of inclined installation type module | 0.3 | 2,155 | 2,236 | 2,288 | 2,314 | 2,317 | 2,317 | 2,317 | 2,317 | 2,317 | 2,317 | 2,317 | 2,317 | 2,317 | 2,317 | 2,317 | 2,317 | 2,317 | 2,317 | 2,317 |
| | 0.4 | 2,098 | 2,185 | 2,247 | 2,289 | 2,312 | 2,317 | 2,317 | 2,317 | 2,317 | 2,317 | 2,317 | 2,317 | 2,317 | 2,317 | 2,317 | 2,317 | 2,317 | 2,317 | 2,317 |
| | 0.5 | 2,027 | 2,128 | 2,200 | 2,252 | 2,288 | 2,310 | 2,317 | 2,317 | 2,317 | 2,317 | 2,317 | 2,317 | 2,317 | 2,317 | 2,317 | 2,317 | 2,317 | 2,317 | 2,317 |
| | 0.6 | 1,951 | 2,060 | 2,146 | 2,208 | 2,254 | 2,286 | 2,307 | 2,316 | 2,317 | 2,317 | 2,317 | 2,317 | 2,317 | 2,317 | 2,317 | 2,317 | 2,317 | 2,317 | 2,317 |
| | 0.7 | 1,873 | 1,986 | 2,080 | 2,154 | 2,211 | 2,252 | 2,282 | 2,302 | 2,314 | 2,317 | 2,316 | 2,317 | 2,317 | 2,317 | 2,317 | 2,317 | 2,317 | 2,317 | 2,317 |
| | 0.8 | 1,796 | 1,911 | 2,008 | 2,090 | 2,157 | 2,209 | 2,252 | 2,275 | 2,295 | 2,309 | 2,316 | 2,317 | 2,317 | 2,317 | 2,317 | 2,317 | 2,317 | 2,317 | 2,317 |
| | 0.9 | 1,718 | 1,835 | 1,936 | 2,021 | 2,093 | 2,153 | 2,201 | 2,238 | 2,265 | 2,286 | 2,300 | 2,310 | 2,316 | 2,317 | 2,311 | 2,315 | 2,316 | 2,317 | 2,317 |
| | 1.0 | 1,643 | 1,758 | 1,861 | 1,950 | 2,025 | 2,089 | 2,143 | 2,187 | 2,222 | 2,250 | 2,271 | 2,286 | 2,298 | 2,306 | 2,278 | 2,280 | 2,274 | 2,241 | 2,106 |
| | 1.1 | 1,574 | 1,686 | 1,786 | 1,876 | 1,955 | 2,022 | 2,078 | 2,126 | 2,166 | 2,199 | 2,225 | 2,245 | 2,260 | 2,271 | 2,211 | 2,200 | 2,167 | 2,088 | 1,931 |
| | 1.2 | 1,507 | 1,617 | 1,716 | 1,803 | 1,881 | 1,950 | 2,009 | 2,060 | 2,101 | 2,136 | 2,164 | 2,185 | 2,200 | 2,209 | 2,120 | 2,094 | 2,038 | 1,936 | 1,782 |
| | 1.3 | 1,444 | 1,551 | 1,648 | 1,734 | 1,811 | 1,878 | 1,937 | 1,988 | 2,031 | 2,066 | 2,093 | 2,113 | 2,125 | 2,128 | 2,021 | 1,981 | 1,912 | 1,801 | 1,655 |
| | 1.4 | 1,383 | 1,488 | 1,582 | 1,667 | 1,742 | 1,809 | 1,866 | 1,916 | 1,957 | 1,991 | 2,016 | 2,034 | 2,042 | 2,039 | 1,919 | 1,872 | 1,793 | 1,683 | 1,545 |
| | 1.5 | 1,326 | 1,427 | 1,519 | 1,602 | 1,676 | 1,741 | 1,797 | 1,845 | 1,885 | 1,917 | 1,940 | 1,953 | 1,957 | 1,946 | 1,822 | 1,769 | 1,686 | 1,579 | 1,448 |
| | 1.6 | 1,272 | 1,370 | 1,459 | 1,540 | 1,612 | 1,676 | 1,730 | 1,776 | 1,814 | 1,843 | 1,863 | 1,873 | 1,871 | 1,855 | 1,732 | 1,673 | 1,590 | 1,487 | 1,363 |
| | 1.7 | 1,221 | 1,316 | 1,402 | 1,480 | 1,550 | 1,611 | 1,664 | 1,708 | 1,744 | 1,770 | 1,787 | 1,793 | 1,787 | 1,768 | 1,646 | 1,585 | 1,504 | 1,405 | 1,287 |
| | 1.8 | 1,174 | 1,266 | 1,349 | 1,424 | 1,491 | 1,550 | 1,601 | 1,643 | 1,676 | 1,700 | 1,714 | 1,717 | 1,709 | 1,686 | 1,566 | 1,505 | 1,426 | 1,331 | 1,220 |
| | 1.9 | 1,131 | 1,218 | 1,299 | 1,371 | 1,436 | 1,492 | 1,541 | 1,580 | 1,611 | 1,633 | 1,645 | 1,646 | 1,635 | 1,610 | 1,493 | 1,432 | 1,356 | 1,265 | 1,159 |
| | 2.0 | 1,090 | 1,174 | 1,252 | 1,321 | 1,383 | 1,436 | 1,484 | 1,522 | 1,550 | 1,570 | 1,580 | 1,579 | 1,566 | 1,538 | 1,425 | 1,366 | 1,292 | 1,205 | 1,103 |
| | 2.1 | 1,052 | 1,133 | 1,207 | 1,275 | 1,334 | 1,386 | 1,430 | 1,466 | 1,493 | 1,511 | 1,519 | 1,517 | 1,501 | 1,470 | 1,363 | 1,305 | 1,234 | 1,150 | 1,053 |
| | 2.2 | 1,016 | 1,095 | 1,166 | 1,231 | 1,288 | 1,338 | 1,380 | 1,414 | 1,440 | 1,456 | 1,462 | 1,457 | 1,439 | 1,408 | 1,306 | 1,250 | 1,181 | 1,100 | 1,007 |
| | 2.3 | 982 | 1,058 | 1,128 | 1,190 | 1,245 | 1,293 | 1,333 | 1,365 | 1,389 | 1,403 | 1,408 | 1,401 | 1,382 | 1,350 | 1,254 | 1,199 | 1,133 | 1,055 | 965 |
| | 2.4 | 949 | 1,023 | 1,091 | 1,151 | 1,204 | 1,250 | 1,289 | 1,319 | 1,341 | 1,354 | 1,356 | 1,348 | 1,328 | 1,297 | 1,205 | 1,152 | 1,088 | 1,012 | 927 |
| | 2.5 | 918 | 990 | 1,056 | 1,114 | 1,166 | 1,210 | 1,246 | 1,275 | 1,295 | 1,306 | 1,307 | 1,298 | 1,278 | 1,247 | 1,160 | 1,108 | 1,046 | 974 | 891 |
| | 2.6 | 888 | 959 | 1,022 | 1,079 | 1,129 | 1,171 | 1,206 | 1,233 | 1,252 | 1,261 | 1,261 | 1,251 | 1,231 | 1,201 | 1,118 | 1,068 | 1,008 | 938 | 858 |
| | 2.7 | 860 | 928 | 990 | 1,045 | 1,093 | 1,134 | 1,167 | 1,193 | 1,210 | 1,219 | 1,218 | 1,208 | 1,188 | 1,158 | 1,079 | 1,030 | 972 | 904 | 828 |
| | 2.8 | 834 | 900 | 959 | 1,012 | 1,059 | 1,098 | 1,131 | 1,155 | 1,171 | 1,179 | 1,178 | 1,167 | 1,148 | 1,118 | 1,043 | 995 | 939 | 873 | 799 |
| | 2.9 | 809 | 873 | 930 | 982 | 1,027 | 1,065 | 1,096 | 1,119 | 1,134 | 1,141 | 1,140 | 1,129 | 1,110 | 1,081 | 1,009 | 963 | 908 | 844 | 772 |
| | 3.0 | 785 | 847 | 903 | 953 | 996 | 1,033 | 1,063 | 1,085 | 1,099 | 1,106 | 1,104 | 1,093 | 1,074 | 1,046 | 977 | 932 | 878 | 817 | 747 |
| | 3.1 | 762 | 822 | 877 | 925 | 968 | 1,003 | 1,032 | 1,053 | 1,067 | 1,072 | 1,070 | 1,060 | 1,041 | 1,013 | 947 | 903 | 851 | 791 | 724 |
| | 3.2 | 741 | 799 | 852 | 899 | 940 | 974 | 1,002 | 1,022 | 1,036 | 1,041 | 1,039 | 1,028 | 1,009 | 982 | 919 | 876 | 825 | 767 | 702 |
| | 3.3 | 721 | 778 | 829 | 875 | 914 | 947 | 974 | 994 | 1,006 | 1,011 | 1,009 | 998 | 980 | 953 | 892 | 851 | 801 | 745 | 682 |
| | 3.4 | 702 | 757 | 807 | 851 | 890 | 922 | 948 | 967 | 978 | 983 | 980 | 970 | 952 | 926 | 867 | 826 | 778 | 723 | 662 |
| | 3.5 | 684 | 737 | 786 | 829 | 866 | 898 | 922 | 941 | 952 | 956 | 953 | 943 | 925 | 900 | — | — | — | — | — |

TABLE 1-continued

Annual integrated amount of solar radiation per one inclined installation type module/installation area per one inclined installation type module
Installation angle of inclined installation type module

| | 0° | 5° | 10° | 15° | 20° | 25° | 30° | 35° | 40° | 45° | 50° | 55° | 60° | 65° | 70° | 75° | 80° | 85° | 90° |
|---|---|---|---|---|---|---|---|---|---|---|---|---|---|---|---|---|---|---|---|
| 3.6 | 666 | 719 | 766 | 808 | 844 | 874 | 899 | 916 | 927 | 931 | 928 | 918 | 900 | 875 | 843 | 804 | 757 | 703 | 644 |
| 3.7 | 650 | 701 | 747 | 788 | 823 | 852 | 876 | 893 | 903 | 907 | 904 | 894 | 877 | 852 | 821 | 782 | 737 | 684 | 626 |
| 3.8 | 634 | 684 | 729 | 769 | 803 | 831 | 854 | 871 | 881 | 884 | 881 | 871 | 854 | 830 | 799 | 762 | 717 | 666 | 610 |
| 3.9 | 619 | 668 | 711 | 750 | 784 | 811 | 834 | 849 | 859 | 862 | 859 | 849 | 833 | 809 | 779 | 742 | 699 | 649 | 594 |
| 4.0 | 605 | 652 | 695 | 733 | 765 | 792 | 814 | 829 | 839 | 842 | 838 | 829 | 812 | 790 | 760 | 724 | 681 | 633 | 579 |
| 4.1 | 591 | 637 | 679 | 716 | 748 | 774 | 795 | 810 | 819 | 822 | 819 | 809 | 793 | 771 | 742 | 706 | 665 | 618 | 565 |
| 4.2 | 578 | 623 | 664 | 700 | 731 | 757 | 777 | 792 | 800 | 803 | 800 | 790 | 775 | 753 | 724 | 690 | 649 | 603 | 552 |
| 4.3 | 565 | 610 | 649 | 685 | 715 | 740 | 760 | 774 | 783 | 785 | 782 | 772 | 757 | 735 | 708 | 674 | 634 | 589 | 539 |
| 4.4 | 553 | 597 | 636 | 670 | 700 | 724 | 743 | 757 | 765 | 768 | 765 | 755 | 740 | 719 | 692 | 658 | 620 | 576 | 527 |
| 4.5 | 542 | 584 | 622 | 656 | 685 | 709 | 728 | 741 | 749 | 752 | 748 | 739 | 724 | 703 | 676 | 644 | 606 | 563 | 515 |
| 4.6 | 531 | 572 | 610 | 642 | 671 | 694 | 713 | 726 | 733 | 736 | 732 | 723 | 709 | 688 | 662 | 630 | 593 | 551 | 504 |
| 4.7 | 520 | 561 | 597 | 630 | 657 | 680 | 698 | 711 | 718 | 721 | 717 | 708 | 694 | 674 | 648 | 617 | 580 | 539 | 493 |
| 4.8 | 510 | 550 | 586 | 617 | 644 | 667 | 684 | 697 | 704 | 706 | 703 | 694 | 680 | 660 | 634 | 604 | 568 | 528 | 483 |
| 4.9 | 500 | 539 | 574 | 605 | 632 | 654 | 671 | 683 | 690 | 692 | 689 | 680 | 666 | 646 | 622 | 592 | 557 | 517 | 473 |
| 5.0 | 491 | 529 | 564 | 594 | 620 | 641 | 658 | 670 | 677 | 679 | 675 | 667 | 653 | 634 | 609 | 580 | 545 | 507 | 463 |
| 5.1 | 482 | 519 | 553 | 583 | 608 | 629 | 646 | 657 | 664 | 666 | 662 | 654 | 640 | 621 | 597 | 568 | 535 | 497 | 454 |
| 5.2 | 473 | 510 | 543 | 572 | 597 | 618 | 634 | 645 | 652 | 653 | 650 | 642 | 628 | 610 | 586 | 558 | 524 | 487 | 446 |

[Second Simulation]

Calculation of a solar radiation amount in the second simulation was in accordance with the first simulation described above.

Furthermore, When the distance in the up-down direction of two inclined installation type modules 2a was an interval l1, and the inclination angle of the inclined installation type module 2a was θ1, in a part located between two inclined installation type modules 2a arranged apart in the up-down direction in the side wall part of the building (hereinafter also simply referred to as an inter-module side wall part), an area of a part irradiated with direct light and an area of a part irradiated with scattered light were calculated by a method described later.

Furthermore, an annual solar radiation amount of direct light was calculated from a solar radiation amount of direct light and the area of the part irradiated with direct light, and an annual solar radiation amount of scattered light was calculated from a solar radiation amount of scattered light and the area of the part irradiated with scattered light. Then, a sum of the annual solar radiation amount of direct light and the annual solar radiation amount of scattered light was regarded as an annual integrated amount of solar radiation of the inter-module side wall part, and this was calculated.

By calculating a length c in the up-down direction of a shadow formed below the inclined installation type module 2a positioned upper, the area of the part irradiated with direct light was calculated based on the calculated ε.

Figure 10:
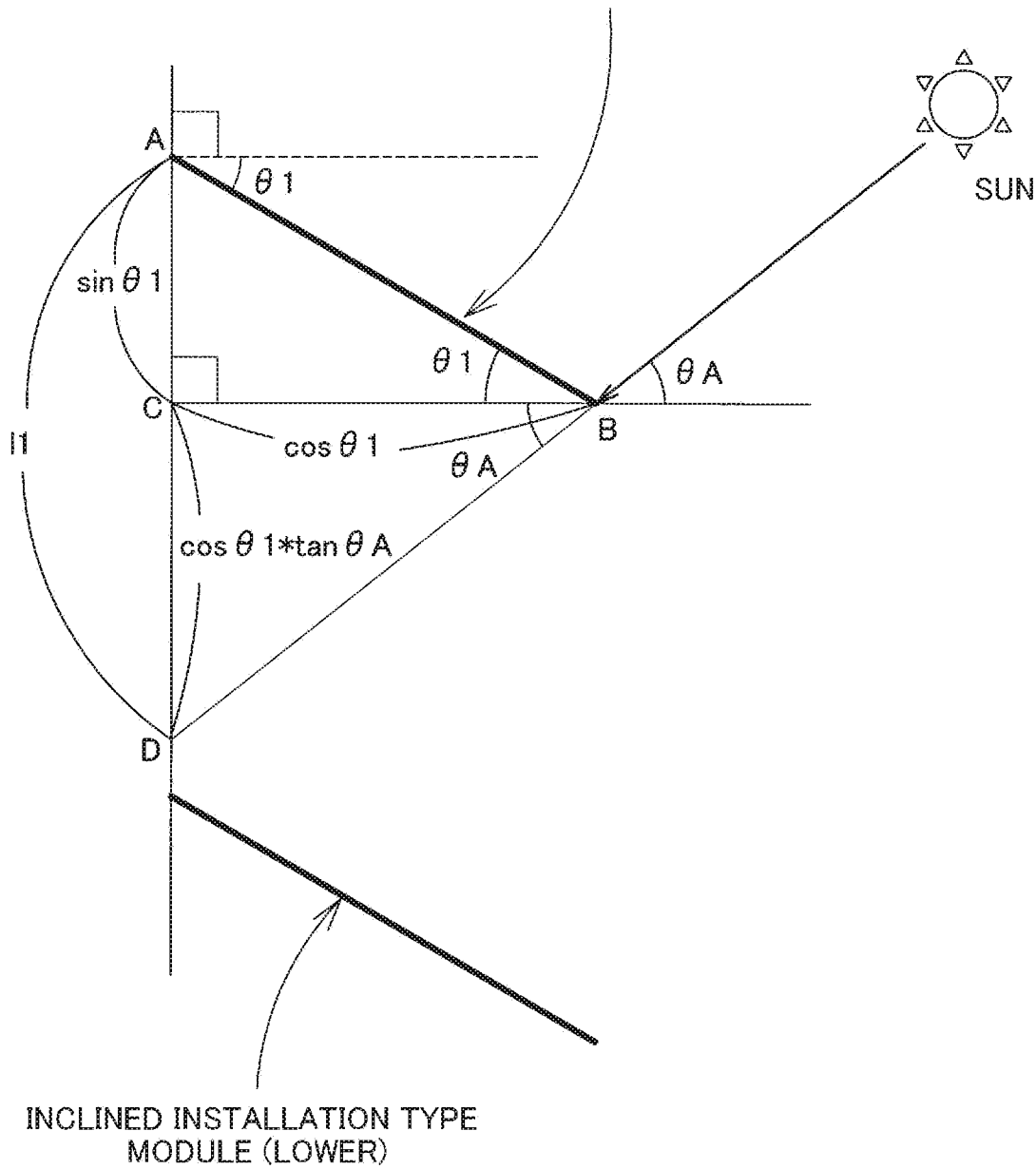
FIG. 10 is a view schematically showing a modeled relationship among the incident angle of direct light, the inclination angle of the inclined installation type module, and a length of a shadow on a wall surface located between two inclined installation type modules arranged adjacently in the up-down direction.

That is, the length a of the shadow was calculated by the following Expression 13 from a model shown in FIG. 10, when the inclination angle of the inclined installation type module 2a was θ1 and the incident angle of direct light was θA.

side AC=sin θ1 side CB=cos θ1 side CD=cos θ1×tan θA $$\varepsilon = \sin θ1 + \cos θ1 \times \tan θA \qquad \text{[Expression 13]}$$

The area of the part irradiated with scattered light was calculated by obtaining a view factor K2.

Figure 11:
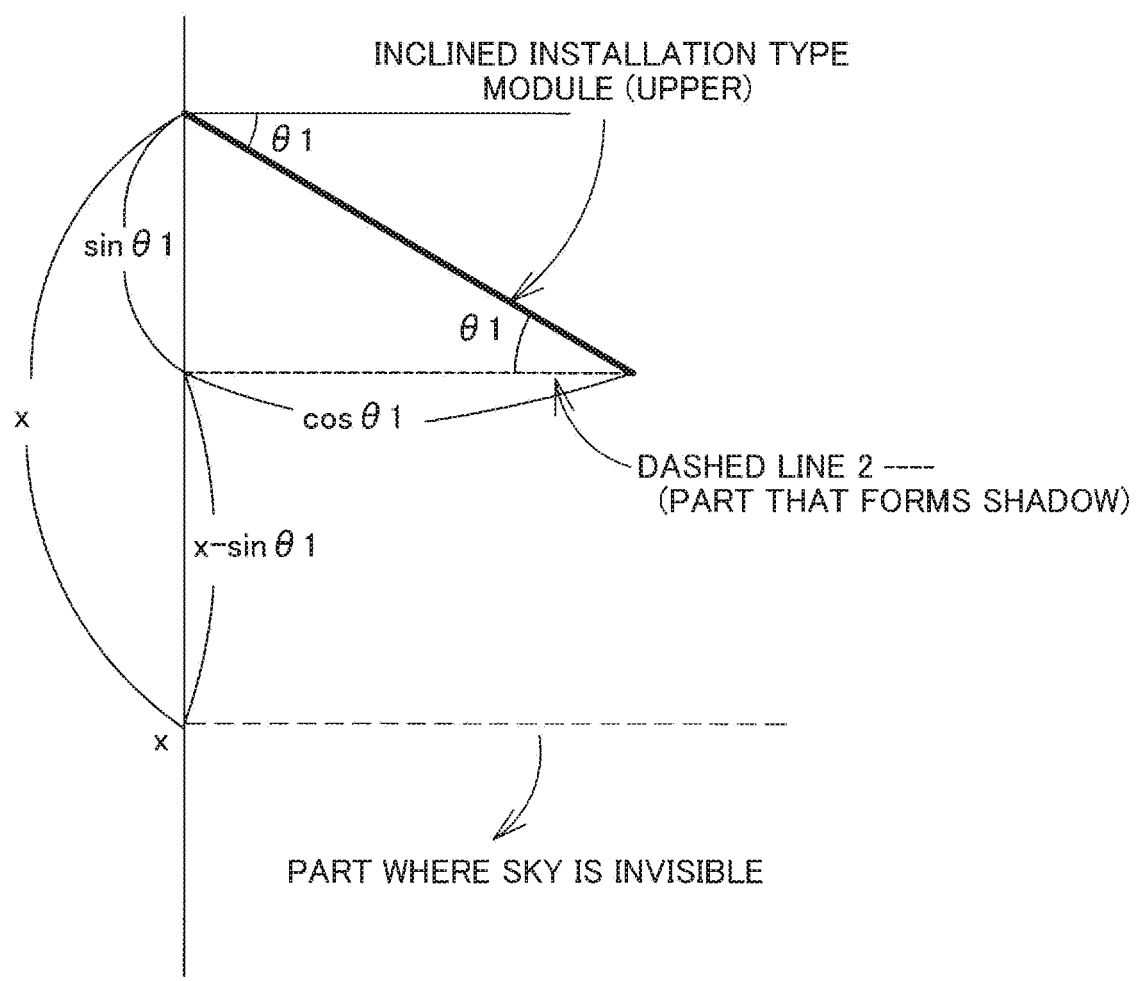
FIG. 11 is a view schematically showing a modeled relationship among the inclination angle of the inclined installation type module, a part where the inclined installation type module irradiated with scattered light forms a shadow, and the side wall of the building.

That is, if a view factor of a part indicated by a dashed line 2 in FIG. 11 is K2, a view factor of the sky is a value (1/2−K2) obtained by subtracting K2 from a view factor of the hemisphere.

At this time, a view factor K2' satisfies the following Expression 14 when viewing a vertical rectangular prism having a distance h from a certain point and lengths a and b of sides.

$$K2' = \frac{1}{2\pi}\left(\tan^{-1}\frac{b}{h} - \frac{h}{\sqrt{a^2+h^2}}\tan^{-1}\frac{b}{\sqrt{a^2+h^2}}\right) \qquad \text{[Expression 14]}$$

Therefore, if this Expression 14 is applied to the part indicated by the dashed line 2 in FIG. 11, the view factor K2 can he calculated from the following Expression 15.

a=cos θ1 b=∞ h=x−sin θ1

$$K2 = 2 \times K2' \qquad \text{[Expression 15]}$$

Figure 12:
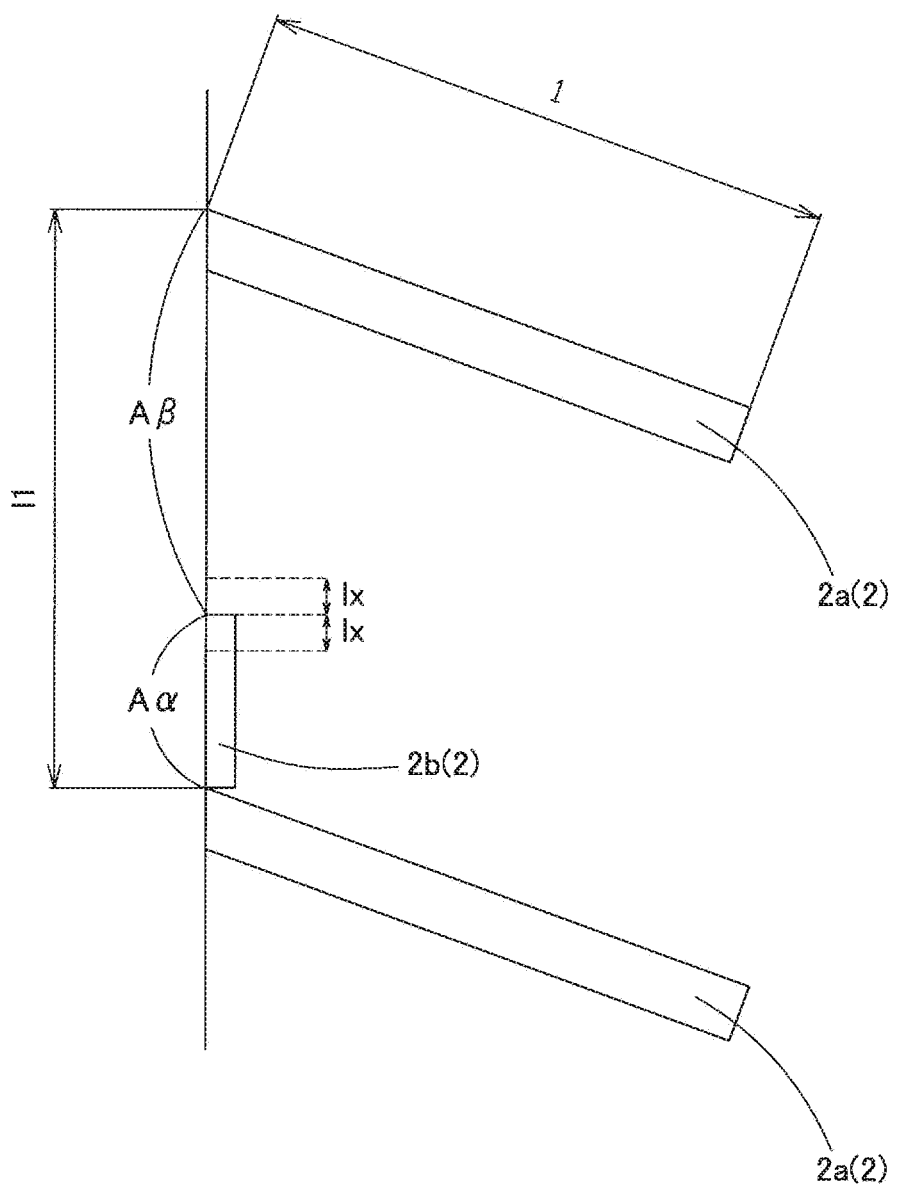
FIG. 12 is a view schematically showing a modeled positional relationship among two inclined installation type modules, a region having a relatively large amount of solar radiation on the wall surface located between the two inclined installation type modules, a region having a relatively small amount of solar radiation, and a vertical installation type module.

Meanwhile, according to the second simulation, it has been found that, by calculating the area of the part irradiated with direct light and scattered light in the inter-module side wall part, each part of the inter-module side wall part is partitioned into a region Aα (a first region) where the integrated amount of solar radiation is relatively large, and a region Aβ (a second region) where the integrated amount of solar radiation is relatively small (see FIG. 12) when the inclination angle of the inclined installation type module 2a is θ1, and the interval in the up-down direction of two inclined installation type modules 2a is l1.

More specifically, it has been found that, by calculating an area irradiated on each part of the inter-module side wall part, when the integrated amount of solar radiation throughout a year per unit area of the entire inter-module side wall part is defined as S4, and when a region where the integrated amount of solar radiation per unit area throughout a year is 0.9×S4 or more is defined as a region Aα, and a region where the integrated amount of solar radiation per unit area throughout a year is less than 0.9×S4 is defined as a region Aβ, the region Aα is formed up to a position upwardly apart by a predetermined distance from the inclined installation type module 2a positioned lower, and the region Aβ is formed in another part above.

Therefore, in the mounting structure 1 of one or more embodiments of the present invention, the vertical installation type module 2b is mounted outside the region Aα where the integrated amount of solar radiation is relatively large.

At this time, an upper end part of the vertical installation type module 2b is in a state arranged between a part positioned upward by lx from a boundary of the two regions (the region Au, the region Aβ) and a part positioned downward by 1x from the same boundary Note that 1x is a length of l1×a, while a is a constant of 0.05 or more to 0.1 or less.

Then, a length in the up-down direction of the vertical installation type module 2b is a length from the inclined installation type module 2a positioned lower to the boundary of two regions positioned upper, in other words, it is equal or substantially equal to a length in the up-down direction of the region Aα.

As described above, in one or more embodiments of the present invention, the upper end part of the vertical installation type module 2b is positioned close to the boundary between the two regions (the region Aα, the region Aβ), and substantially entire part (most of the part) of the light receiving surface of the vertical installation type module 2b is arranged outside the region Aα. In other words, the vertical installation type module 2b is arranged at a position closer to the inclined installation type module 2a positioned lower, in the inter-module side wall part. In other words, the upper end of the vertical installation type module 2b is arranged at a position downwardly apart from the inclined installation type module 2a positioned upper, and the lower end of the vertical installation type module 2b is in contact with or in proximity with a slight space to the upper end of the inclined installation type module 2a positioned lower. This makes it possible to reduce an area of a shadow formed on the light receiving surface of the vertical installation type module 2b, and to increase the power generation efficiency of the vertical installation type module 2b.

Further, the mounting method for constructing the mounting structure 1 of the present embodiment includes performing of: a first process of fixing the inclined installation type module 2a in a state arranged in parallel at an interval in the up-down direction so as to satisfy the relationship of Expression 1 above, and a second process of fixing the vertical installation type module 2b to the inter-module side wall part such that the upper end part of the vertical installation type module 2b is located between the part positioned upward by 1x from the boundary of the two regions, and the part positioned downward by 1x from the same boundary.

Although the disclosure has been described with respect to only a limited number of embodiments, those skilled in the art, having benefit of this disclosure, will appreciate that various other embodiments may he devised without departing from the scope of the present invention. Accordingly, the scope of the invention should he limited only by the attached claims.

EXPLANATION OF REFERENCE SIGNS 1 solar cell module mounting structure
2 solar cell module
2a inclined installation type module (first solar cell module)
2b vertical installation type module (second solar cell module)

The invention claimed is:

1. A solar cell module mounting system for fixing a plurality of solar cell modules to a side wall of a building, the plurality of solar cell modules comprise a plurality of first solar cell modules and a plurality of second solar cell modules, wherein each of the plurality of first solar cell modules includes a first side and a second side, the first side being proximal to the side wall of the building, the second side being distally positioned and lower than the first side and/or at a position outwardly away from the side wall part of the building, wherein the plurality of the first solar cell modules are arranged vertically, wherein a relationship of Expression 1 below is satisfied, for adjacent vertically arranged first solar cell modules, with a definition of θ1 as an angle formed by a light receiving surface of an upper of the adjacent first solar cell module and a horizontal plane, and l1 as a distance from the first side of the upper of the adjacent first solar cell modules to the first side of the lower of the adjacent first solar cell modules, and with a condition of a distance between the first and second sides of the first solar cell module is defined as 1;

$16 \leq \theta1-(32/l1) \leq 56$ [Expression 1]

wherein each of the plurality of second solar cell modules is arranged between the first side of the upper of the adjacent solar cell modules and the first side of the lower of the adjacent solar cell modules, wherein the plurality of second solar cell modules are fixed such that a light receiving surface of the second solar cell modules is parallel to an outer peripheral surface of the side wall of the building, wherein a total region between the first side of the upper of the adjacent solar cell modules and the first side of the lower of the adjacent solar cell modules consists of a first region and a second region, wherein an upper end of the second solar cell module is close to a boundary between the first region and the second region, and wherein with a definition of S4 as an annual integrated amount of solar radiation per unit area, the first region has an annual integrated amount of solar radiation per unit area equal to 0.9×S4 or more while the second region has an annual integrated amount of solar radiation per unit area less than 0.9×S4.

2. The solar cell module mounting system according to claim 1, wherein the upper end of the second solar cell module is arranged between a part upwardly apart from the boundary by a predetermined distance lx and a part downwardly apart from the boundary by a predetermined distance lx while lx satisfies Expression 16 below;

$lx=l1 \times a$ [Expression 16]

(with a constant of a from 0.05 or more to 0.1 or less).

3. The solar cell module mounting system according to claim 1, wherein the annual integrated amount of solar radiation is a sum of an annual integrated amount of solar radiation of direct light and an annual integrated amount of solar radiation of scattered light.

4. The solar cell module mounting system according to claim 1, wherein the plurality of first solar cell modules are members having a rectangular flat plate shape with the two sides being long sides.

5. A solar cell module mounting method for fixing a plurality of solar cell modules to a side wall of a building, the method comprising:

fixing on the side wall a plurality of first solar cell modules in parallel at an interval in an up-down direction, wherein the plurality of solar cell module comprise the plurality of first solar cell modules, wherein each of the plurality of the first solar cell modules includes a first side and a second side, the first side being proximal to the side wall of the building, the second side being distally positioned and lower than the first side and/or at a position outwardly away from the side wall of the building, wherein the plurality of the first solar cell modules are arranged vertically, and wherein the solar cell module mounting method further comprises fixing the plurality of adjacent vertically arranged first solar cell modules so as to satisfy a relationship of Expression 1 below, with a definition of θ1 as an angle formed by a light receiving surface of an upper of the adjacent first solar cell modules and a horizontal plane, and l1 as a distance from the first side of the upper of the adjacent first solar cell modules to the first side of the lower of the adjacent first solar cell module, and with a condition of a distance between the first and second sides of the first solar cell module is defined as 1;

$16 \leq \theta1-(32/l1) \leq 56$ [Expression 1]

;and fixing a plurality of second solar cell modules between the first side of the upper of the adjacent solar cell modules and the first side of the lower of the adjacent solar cell modules, wherein the plurality of second solar cell modules are fixed such that a light receiving surface of the second solar cell modules is parallel to an outer peripheral surface of the side wall of the building, wherein a total region between the first side of the upper of the adjacent solar cell modules and the first side of the lower of the adjacent solar cell modules consists of a first region and a second region, wherein an upper end of the second solar cell module is close to a boundary between the first region and the second region, and wherein with a definition of S4 as an annual integrated amount of solar radiation per unit area, the first region has an annual integrated amount of solar radiation per unit area equal to 0.9×S4 or more while the second region has an annual integrated amount of solar radiation per unit area less than 0.9×S4.

\* \* \* \* \*